(12) United States Patent
Christen

(10) Patent No.: US 8,601,651 B2
(45) Date of Patent: Dec. 10, 2013

(54) DEVICES FOR SUPPORTING AND TRANSPORTING SHEET MATERIALS

(75) Inventor: Frederick Joseph Christen, St. Louis, MO (US)

(73) Assignee: Hallmark Stone Company, Fenton, MO (US)

( * ) Notice: Subject to any disclaimer, the term of this patent is extended or adjusted under 35 U.S.C. 154(b) by 96 days.

(21) Appl. No.: 12/574,601

(22) Filed: Oct. 6, 2009

(65) Prior Publication Data

US 2010/0019116 A1 Jan. 28, 2010

Related U.S. Application Data

(62) Division of application No. 11/873,108, filed on Oct. 16, 2007, now abandoned.

(51) Int. Cl.
*A47B 96/06* (2006.01)

(52) U.S. Cl.
USPC .......... 24/569; 24/457; 24/486; 24/514; 24/525; 269/905; 269/37; 269/92; 269/114

(58) Field of Classification Search
USPC ........ 24/457, 486, 525, 514, 569; 269/289 R, 269/43, 905, 45, 249, 37, 252, 92, 42, 113, 269/114; 248/229.15
See application file for complete search history.

(56) References Cited

U.S. PATENT DOCUMENTS

| | | | |
|---|---|---|---|
| 2,503,388 A | 4/1950 | Hedlund | |
| 2,818,988 A | 1/1958 | Dunkin | |
| 2,830,632 A | 4/1958 | La Rouche | |
| 2,967,627 A | 1/1961 | Vinson | |
| 2,991,669 A * | 7/1961 | Stock | 269/154 |
| 3,170,708 A * | 2/1965 | Miller | 280/47.32 |
| 3,468,509 A * | 9/1969 | Foltz | 248/316.6 |
| 3,580,601 A | 5/1971 | Miles | |
| 3,861,662 A | 1/1975 | Morse | |
| 4,050,671 A | 9/1977 | Coleman | |
| 4,138,099 A | 2/1979 | Englehart | |
| 4,270,741 A | 6/1981 | Hurst | |
| 4,278,244 A | 7/1981 | Carter | |
| 4,318,537 A * | 3/1982 | Dorman et al. | 269/302.1 |
| 4,488,733 A | 12/1984 | Hellsten | |
| 4,729,552 A | 3/1988 | Pempek | |

(Continued)

OTHER PUBLICATIONS

Omni Cubed: Pro-Cart AT1, Omni Cubed, Inc., Engineering to a Higher Power, All-Terrain Countertop Installation Cart, http://store.omnicubed.com/merchant2/merchant.mvc?Screen=CTGY&Store_Code=OMN . . . , 10 pages, printed Nov. 3, 2009.

(Continued)

*Primary Examiner* — Robert J Sandy
*Assistant Examiner* — Michael Lee
(74) *Attorney, Agent, or Firm* — Harness, Dickey & Pierce, P.L.C.

(57) ABSTRACT

In one exemplary embodiment, a low-profile clamping system generally includes first and second elongate supports engageable with an edge portion of a sheet material for supporting at least part of the sheet material against bending. A fastener can releasably couple the first and second elongate supports to the edge portion of the sheet material. The first and second elongate supports define a channel for receiving the edge portion of the sheet material into the channel when supporting the sheet material. In another exemplary embodiment, an apparatus for transporting a sheet material generally includes a frame, at least one wheel coupled to the frame for allowing rolling movement of the frame, and an adjustable vice coupled to the frame for securing a sheet material in the vice on the frame.

18 Claims, 5 Drawing Sheets

(56) References Cited

U.S. PATENT DOCUMENTS

| | | | |
|---|---|---|---|
| 4,793,624 A | | 12/1988 | Mace |
| 4,828,241 A | * | 5/1989 | Yang .............................. 269/114 |
| 5,494,553 A | * | 2/1996 | Colucci ......................... 156/580 |
| 7,055,787 B2 | * | 6/2006 | Cross ......................... 248/226.11 |
| 7,469,903 B2 | * | 12/2008 | Marshall et al. .............. 273/407 |
| 2005/0133979 A1 | | 6/2005 | Livingston, Jr. et al. |
| 2008/0042027 A1 | * | 2/2008 | LaScala ................... 248/229.15 |

OTHER PUBLICATIONS

Omni Cubed, Inc., Engineering to a Higher Power, How to Stand Out in the Market? Use our tools to deliver quality . . . not just countertops. 1 page, Apr. 2008.

VIC international Corporation; www.vicintl.com/equip/mat_hand.html; accessed Jan. 28, 2008; 29 pgs.

Braxton-Bragg Corporation; *Braxton-Bragg 2007 Catalog;* 2007, Knoxville, TN.

Granite City Tool Company; *Granite City Tool—Fabrication Catalog,* 2007, vol. 2, Waite Park, MN.

Sommer & Maca Industries, Inc.; *Somaca Stone Tools & Supplies Catalog,* 2007, Cicero, IL.

GranQuartz; *GranQuartz Stone Tools and Equipment Catalog,* 2007, Tucker, GA.

VIC International Corporation, *Stone Fabrication Catalog,* Fall/Winter 2006, Knoxville, TN.

\* cited by examiner

US 8,601,651 B2

DEVICES FOR SUPPORTING AND TRANSPORTING SHEET MATERIALS

CROSS-REFERENCE TO RELATED APPLICATION

This application is a divisional application of U.S. patent application Ser. No. 11/873,108 filed Oct. 16, 2007, the entire disclosure of which is incorporated herein by reference.

FIELD

The present disclosure generally relates to devices for supporting and transporting sheet materials, and more particularly to clamping systems positionable over edge portions of sheet materials for supporting the sheet materials against bending, and dollies for transporting the sheet materials.

BACKGROUND

The statements in this section merely provide background information related to the present disclosure and may not constitute prior art.

Sheet materials (e.g., natural stone countertops, glass sheets, etc.) are often used, for example, in building construction. The sheet materials are often processed (e.g., cut, shaped, finished, etc.) at one location and then stored and later transported to a construction destination for installation. Such sheet materials, however, are often fragile and can be damaged during processing, storage, and/or transportation if not properly supported and/or handled.

SUMMARY

Exemplary embodiments of the present disclosure are generally directed toward clamping systems suitable for installation to, for example, sheet materials for use in supporting at least part of the sheet materials against bending. In one exemplary embodiment, a clamping system generally includes first and second elongate supports engageable with a sheet material for supporting at least part of the sheet material. A fastener can releasably couple the first and second elongate supports to the sheet material. The first elongate support includes an opening. The fastener extends through the opening when releasably coupling the first and second elongate supports to the sheet material.

In another exemplary embodiment, a clamping system generally includes first and second opposing engagement members for receiving an edge portion of a sheet material between the engagement members when supporting at least part of the sheet material. A fastener can releasably couple the first and second engagement members to the edge portion of the sheet material. At least part of the first engagement member is generally contained within a first plane, and at least part of the second engagement member is generally contained within a second plane oriented generally parallel to the first plane. The fastener is disposed generally between the first and second planes.

In still another exemplary embodiment, a clamping system generally includes first and second elongate supports engageable with an edge portion of a sheet material for supporting at least part of the sheet material. A fastener can releasably couple the first and second elongate supports to the edge portion of the sheet material. The first and second elongate supports define a channel for receiving the edge portion of the sheet material into the channel when supporting the sheet material.

Other exemplary embodiments of the present disclosure are generally directed toward apparatus for transporting sheet materials. In one exemplary embodiment, an apparatus generally includes a frame, at least one wheel coupled to the frame for allowing rolling movement of the frame, and an adjustable vice coupled to the frame for securing a sheet material in the vice on the frame.

Further areas of applicability will become apparent from the description provided herein. It should be understood that the description and specific example embodiments are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
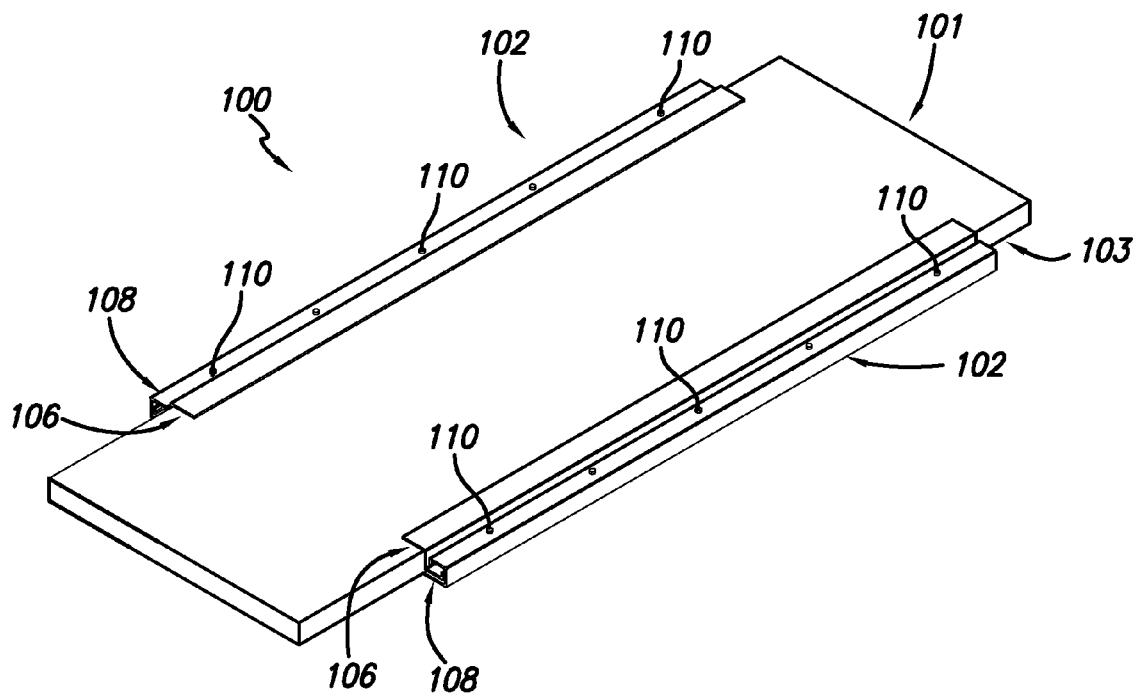
FIG. 1 is a perspective view of an exemplary embodiment of a clamping system shown installed to a countertop.

The following description is merely exemplary in nature and is not intended to limit the present disclosure, application, or uses.

Referring now to the drawings, FIGS. 1-4 illustrate an exemplary embodiment of a clamping system 100 for use in supporting at least part of a sheet material (e.g., a countertop 101, etc.) against bending. The clamping system 100 may be installed to the countertop 101 to provide stability, stiffness, rigidity, etc. to the countertop 101 during, for example, processing, transport, installation, etc. It is to be understood that sheet material, as used herein, may include any material and/or form of material that is desired to be supported within the scope of the present disclosure. For example, sheet material may include natural stone materials (e.g., granite, marble, limestone, slate, etc.), glass, metals, plastics, woods, composites, etc. And sheet material may be in the form of countertops, sheets, slabs, sheet-type building materials, other sheet-type materials, etc.

As shown in FIG. 1, the illustrated clamping system 100 generally includes two clamps (each indicated at 102) that are each positionable over a respective longitudinal edge portion 103 of the countertop 101. For example, each clamp 102 may be slid over a respective longitudinal edge portion 103 of the countertop 101 and then releasably coupled (e.g., secured, tightened, compressed, etc.) to the countertop 101 to support (e.g., provide stability, stiffness, etc.) at least part of the countertop 101 against bending. The clamps 102 can be positioned over any edge portion of the countertop 101 (not just the longitudinal edge portions 103) within the scope of the present disclosure. In other exemplary embodiments, clamping systems may include more than or fewer than two clamps for use in supporting sheet materials.

Figure 2:
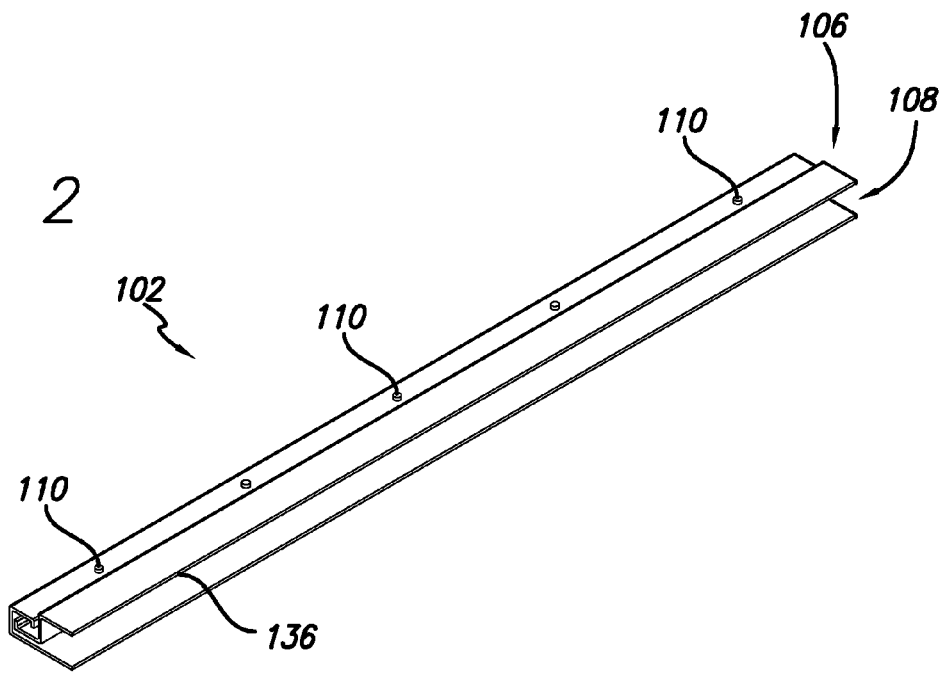
FIG. 2 is a perspective view of a clamp of the clamping system of FIG. 1 with the countertop removed.

With reference now to FIG. 2, one clamp 102 of the illustrated clamping system 100 will be described with it understood that a description of the other clamp 102 is substantially the same. The illustrated clamp 102 includes a first elongate support 106 and a second elongate support 108. The supports 106 and 108 are engageable with a longitudinal edge portion 103 of the countertop 101 for supporting at least part of the countertop 101 against bending (FIG. 1). Fasteners 110 are provided for releasably securing the first and second supports 106 and 108 to the countertop 101. The supports 106 and 108 and/or fasteners 110 may be formed from materials including, for example, metals (e.g., steel, aluminum, etc.), plastics, composites, combinations thereof, etc. within the scope of the present disclosure. And the fasteners 110 can include, for example, screws, bolts, pins, clips, tabs, springs, other spring members, levers, cams, etc. within the scope of the present disclosure. Alternatively, one or more of the fasteners 110 may be formed integrally, monolithically, etc. with the second support 108 within the scope of the present disclosure. Further, the fasteners 110 may be countersunk relative to the second support 108. And while the illustrated clamp 102 includes five fasteners 110, in other exemplary embodiments, clamping systems may include clamps having more than or fewer than five fasteners (e.g., three fasteners, etc.).

Figure 3:
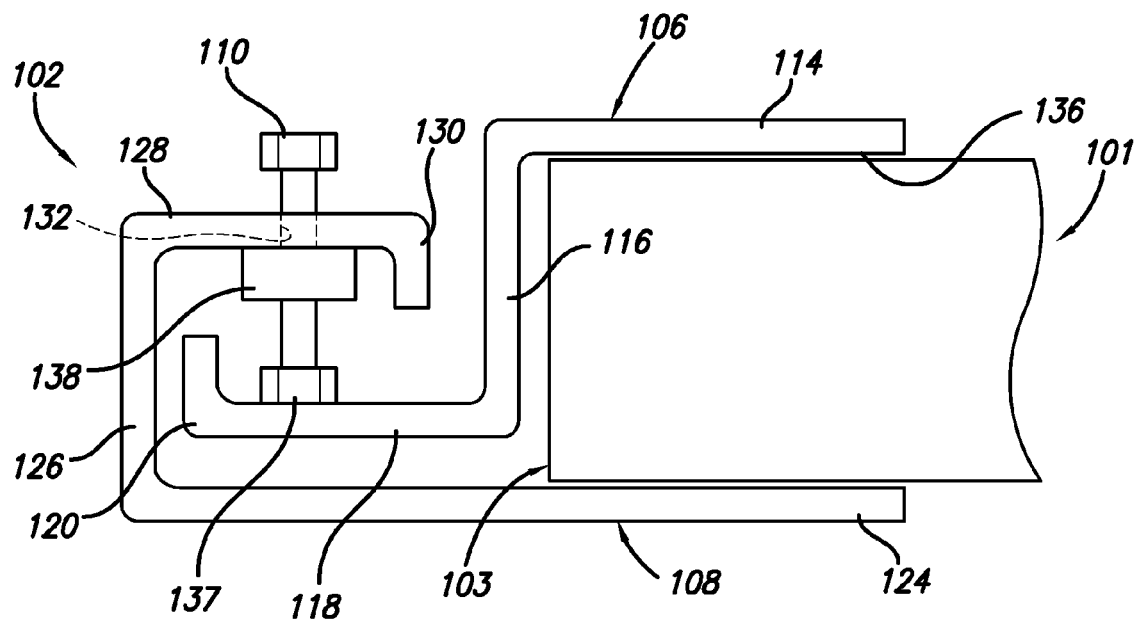
FIG. 3 is a fragmentary end elevation view of the clamp of FIG. 2 shown secured to the countertop.

As shown in FIG. 3, the first support 106 of the illustrated clamp 102 is generally S-shaped (as generally defined by three bends in the support 106). The bent shape of the support 106 can help rigidify, stiffen, etc. the support 106 against bending to help provide support to the countertop 101. The support 106 generally includes an engagement member 114 for engaging an upper part of the countertop 101. The support 106 also includes a back member 116 connected to the engagement member 114, and a fastener member 118 connected to the back member 116. The back member 116 is oriented generally perpendicularly to the engagement member 114; and the fastener member 118 is oriented generally perpendicularly to the back member 116. The fastener member 118 can also include a lip 120 to help, for example, further rigidify, etc. the support 106 against bending.

The second support 108 of the illustrated clamp 102 is generally C-shaped (as defined by three bends in the support 108). The bent shape of the support 108 can help rigidify, stiffen, etc. the support 108 against bending to help provide support to the countertop 101 (together with the first support 106). The support 108 generally includes an engagement member 124 for engaging a lower part of the countertop 101. The support 108 also includes a back member 126 connected to the engagement member 124, and a fastener member 128 connected to the back member 126. The back member 126 is oriented generally perpendicularly to the engagement member 124; and the fastener member 128 is oriented generally perpendicularly to the back member 126. The fastener member 128 includes openings 132 (shown by broken lines in FIG. 3; only one opening 132 is visible) for receiving the fasteners 110 through the second support 108 to releasably secure the first and second elongate supports 106 and 108 to the countertop 101. The fastener member 128 can also include a lip 130 to help, for example, further rigidify, etc. the support 108 against bending.

In other exemplary embodiments, clamping systems may include clamps with supports defining shapes different than disclosed herein and/or having different numbers of bends than disclosed herein depending, for example, on the material used to form the supports and/or the supporting requirements of sheet materials to be supported. For example, clamp supports may have engagement members, back members, and/or fastener members oriented relative to each other differently than, for example, generally perpendicularly within the scope of the present disclosure.

With continued reference to FIG. 3, the first and second supports 106 and 108 of the illustrated clamp 102 are generally coupled together to define a channel 136 configured (e.g., sized, shaped, constructed, etc.) to receive the longitudinal edge portion 103 of the countertop 101 therein. More particularly, the engagement member 114 of the first support 106, the back member 116 of the first support 106, and the engagement member 124 of the second support 108 generally define the channel 136. And the fastener member 118 of the first support 106, and the back member 126 and fastener member 128 of the second support 108 are disposed generally exteriorly of the channel 136. The fastener members 118 and 128 of the first and second supports 106 and 108 are also positioned in generally parallel relation to each other, with the fastener member 118 of the first support 106 positioned generally below the fastener member 128 of the second support 108.

In the illustrated embodiment, the first and second supports 106 and 108 are loosely coupled together independently of the fasteners 110. For example, coupling pins (not shown) can be connected to the first and second supports 106 and 108 toward longitudinal ends of the supports 106 and 108 to loosely couple the supports 106 and 108 together. The coupling pins can generally hold the first and second supports 106 and 108 together, but can also allow relative movement of the supports 106 and 108 to help position the supports 106 and 108 over the longitudinal edge portion 103 of the countertop 101 (before the fasteners 110 are tightened). This relative movement can allow the same clamp 102 to be used with different sized countertops having, for example, different thickness dimensions, etc. In other exemplary embodiments, clamping systems may include clamps with fasteners that act to both couple supports of the clamps together and releasably secure the clamps to sheet materials. In still other exemplary embodiments, clamping systems may include clamps with supports that are coupled together differently than disclosed herein (e.g., spring clips, hinges, etc.), or clamps with supports that are not coupled together at all (e.g., the supports may be individually positioned on sheet materials and then releasably secured to the sheet material by fasteners, etc.).

As also shown in FIG. 3, the fasteners 110 used to releasably secure the clamp 102 to the countertop 101 extend through the openings 132 in the fastener member 128 of the second support 108 and engage the fastener member 118 of the first support 106. Base members 137 (e.g., nuts, washers, plates, etc.) may be connected to the fasteners 110 to improve contact between the fasteners 110 and the fastener member 118 of the first support 106. Fastening fixtures 138 (e.g., spring clips, threaded nuts, etc.) connected (e.g., welded, riveted, etc.) to the second support 108 (generally under the fastener member 128 at the openings 132) are configured (e.g., sized, shaped, constructed, etc.) to receive the fasteners 110 and help releasably secure the first and second supports 106 and 108 to the countertop 101. In the illustrated embodiment, the fasteners 110 include threaded bolts and the fastening fixtures 138 include correspondingly threaded nuts. And the fasteners 110 are matingly received into the fastening fixtures 138 to allow the fasteners 110 to be tightened to secure the first and second supports 106 and 108 to the countertop 101 (e.g., to compress and secure the first and second supports 106 and 108 against the countertop 101). Fasteners other than threaded fasteners, and/or fastening fixtures other than threaded fastening fixtures may be used within the scope of the present disclosure. And while in the illustrated embodiment, one fastening fixture 138 is provided for receiving each fastener 110, in other exemplary embodiments, single fastening fixtures may be provided for receiving all fasteners of clamps. For example, in one exemplary embodiment, a clamp may include a support in which a single fastening fixture is connected to an underside of a fastener member of the support. Here, openings are formed in the single fastening fixture to receive each fastener through the single fastening fixture to secure the clamp to sheet material.

Installation of the illustrated clamping system 100 to the countertop 101 will now be described with reference to FIGS. 1 and 3. Each of the clamps 102 may initially be positioned over opposing longitudinal edge portions 103 of the countertop 101 at generally central locations along the edge portions 103. The clamps 102 may then be secured to the countertop 101 by the fasteners 110. Positioning and securing one clamp 102 to a longitudinal edge portion 103 of the countertop 101 will be described with it understood that a description of positioning and securing the other clamp 102 is the same.

The fasteners 110 of the clamp 102 can initially be loosened so that the supports 106 and 108 of each clamp 102 can be moved relative to each other. This allows the supports 106 and 108 to be generally separated to provide space between the supports 106 and 108 to properly position the clamp 102 over the countertop edge portion 103. The separated supports 106 and 108 may then be slid over the countertop edge portion 103 so that the first support 106 is located generally over an upper part of the countertop edge portion 103 and the second support 108 is located generally under a lower part of the counter top edge portion 103 (with the countertop edge portion 103 thus received between the engagement members 114 and 124 of the first and second supports 106 and 108 (FIG. 3)). As shown in FIG. 3, in this position the back member 116 of the first support 106 may be closely adjacent the edge portion 103 (or may abut the edge portion 103 in other exemplary embodiments). The generally thin configuration (e.g., size, shape, construction, etc.) of the first and second supports 106 and 108 can allow them to be positioned (e.g., slid, etc.) over the countertop edge portion 103 while the countertop 101 is laying on a surface without lifting the countertop 101 off the surface. For example, the second support 108 may be easily slid under the countertop 101, between the countertop edge portion 103 and the surface, without lifting the countertop 101.

After positioning the first and second supports 106 and 108 over the countertop edge portion 103, the fasteners 110 may be tightened to secure the supports 106 and 108 against the countertop 101 (e.g., to provides a force against the countertop 101 to hold the supports 106 and 108 on the countertop 101, etc.). The fasteners 110 may be tightened by using, for example, a tool (e.g., an allen wrench, etc.) to rotate the fasteners 110 through the fastening fixtures 138 to compress the supports 106 and 108 against the countertop 101. As the fasteners 110 are moved through the fastening fixtures 138, they apply a pushing force on the fastener member 118 of the first support 106. This moves the first support 106 generally toward the second support 108, and the engagement members 114 and 124 of each support 106 and 108 securely into engagement with the countertop 101. Additional tightening movement of the fasteners 110 can flex the fastener members 118 and/or 128 of the first and/or second supports 106 and/or 108 relative to their corresponding engagement members 114 and 124. This can create a tension force in the supports 106 and/or 108 that can further help compress the engagement members 114 and 124 of the supports 106 and 108 against the countertop 101 (and further help securely hold the clamp 102 on the countertop 101).

The clamps 102 may each be removed from the edge portions 103 of the countertop 101 when necessary by loosening the fasteners 110 of each clamp 102 and sliding each clamp 102 off the respective countertop edge portion 103. The clamps 102 may then be reused as desired. The engagement members 114 and 124 of the clamp supports 106 and 108 may include linings, coverings, etc. to help prevent the engagement members 114 and 124 of the supports 106 and 108 from marring, scratching, etc. a surface of the countertop 101 when secured thereto.

With reference again to FIGS. 1 and 3, the illustrated clamping system 100 may be understood to have a generally low profile, for example relative to a thickness of the countertop 101. For example, in each clamp 102, at least part of the engagement member 114 of the first support 106 is generally contained within a first plane, and at least part of the engagement member 124 of the second support 108 is generally contained within a second plane (FIG. 3). The first plane is oriented generally parallel to the second plane, and the fasteners 110 of the clamp 102 are disposed generally between the first and second planes of the clamp 102 such that the fasteners 110 do not extend substantially above and/or below the supports 106 and 108 (FIG. 3). Thus, installation of the clamping system 100 to the countertop 101 does not substantially increase the total thickness of the countertop 101 (FIG. 3).

The low-profile clamping system 100 can provide support to the countertop 101 during processing operations (e.g., cutting, finishing, etc.) of the countertop 101 without interference by the clamping system 100. For example, the low-profile clamping system 100 and countertop 101 are generally within input tolerances (e.g., thickness tolerances, etc.) of tools and/or machines used to process the countertop 101. The countertop 101 and clamping system 100 can thus move together through the various processing tools and/or machines without interference by the clamping system 100.

Figure 4:
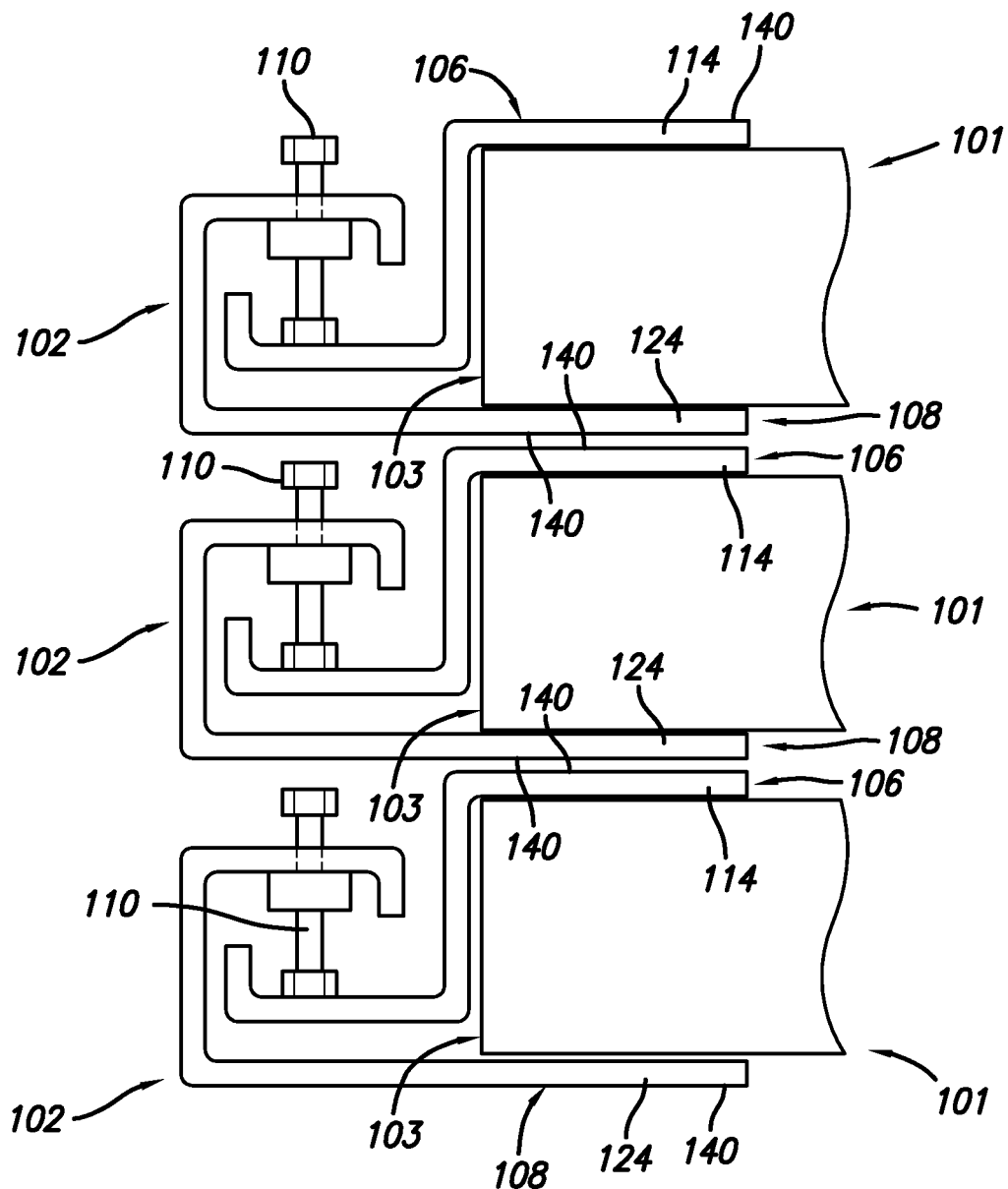
FIG. 4 is a fragmentary end elevation view of three of the clamps of FIG. 2 each shown secured to a countertop with the countertops arranged in a generally stacked orientation.

The low-profile clamping system 100 also can provide support to the countertop 101 during storing and/or transport of the countertop 101 without wasting space between the countertop 101 and an adjacent stacked, positioned, etc. countertop. For example, the low-profile clamping system 100 allows the countertop 101 to be closely stacked, positioned, etc. with other countertops having, for example, clamping systems 100 installed thereto. In FIG. 4, for example, three countertops (each indicated 101) are shown each with a clamp 102 of the low-profile clamping system 100 secured thereto. And the countertops 101 and clamps 102 are shown vertically stacked (and horizontally oriented) in close relationship (e.g., without large, wasted spaces between the countertops 101, etc.). The engagement members 114 and 124 of the first and second supports 106 and 108 each define an exterior stacking surface 140 which allows the countertops 101 to be stacked in close relationship. The countertops 101 may be stacked with the stacking surface 140 of one clamp 102 in generally face-to-face engagement with the stacking surface of an adjacent clamp 102. Alternatively, the countertops 101 may be stacked with the stacking surface 140 of one clamp 102 in generally face-to-face engagement with at least part of a surface of an adjacent countertop 101. It is to be understood that the countertops 101 may be vertically oriented and closely stored within the scope of the present disclosure. In other exemplary embodiments, clamping systems may include clamps in which adjacent stacking surfaces have complimentary groove pairs such that adjacent sheet materials are inhibited from sliding in one or more directions.

The low-profile clamping system 100 can further provide support to the countertop 101 during installation of the countertop 101 (e.g., installation of a countertop in a residential home, etc.) without interfering with installation operation. For example, the low-profile clamping system 100 can provide support to the countertop 101 as it is transported to a location for installation, and as it is manipulated (e.g., carried, rotated, etc.) during the installation operation without interference. As such, the clamping system 100 may allow the countertop 101 to be positioned above a lower section of cabinets and below an upper section of cabinets without interference (and without requiring removal of the clamping system 100 before positioning the countertop 101).

In another exemplary embodiment, a clamping system includes a clamp having an overall length dimension of about 72.0 inches (about 182.9 centimeters). A first support is generally S-shaped and includes an engagement member having a length dimension of about 2.3 inches (about 5.7 centimeters), a beach member having a length dimension of about 1.0 inches (about 2.5 centimeters), and a fastener member having a length dimension of about 1.0 inches (about 2.5 centimeters). A second support is generally C-shaped and includes an engagement member having a length dimension of about 3.3 inches (about 8.3 centimeters), a back member having a length dimension of about 1.0 inches (about 2.5 centimeters), and a fastening member having a length dimension of about 1.0 inches (about 2.5 centimeters). The engagement member, back member, and fastener member of each support may have a thickness dimension of about 0.1 inches (about 0.2 centimeters).

In this embodiment, the first and second supports may be coupled together by coupling pins. The coupling pins can generally hold the first and second supports together, but can also allow relative movement of the supports to help position the supports over the edge portion of the sheet material. The supports can thus be adjusted to accommodate sheet material having thicknesses, for example, between about 1.1 inches (about 2.7 centimeters) and about 1.4 inches (about 3.6 centimeters). Clamping systems may include clamps with different dimensions than disclosed herein. For example, in one exemplary embodiment, a clamp may have a length dimension of about thirty-six inches. In other exemplary embodiments, clamping systems may include clamps each having one or more different length dimensions. Further, it should be appreciated that the length dimension of a clamp may indicate a number of fasteners to be included with the clamp.

Figure 5:
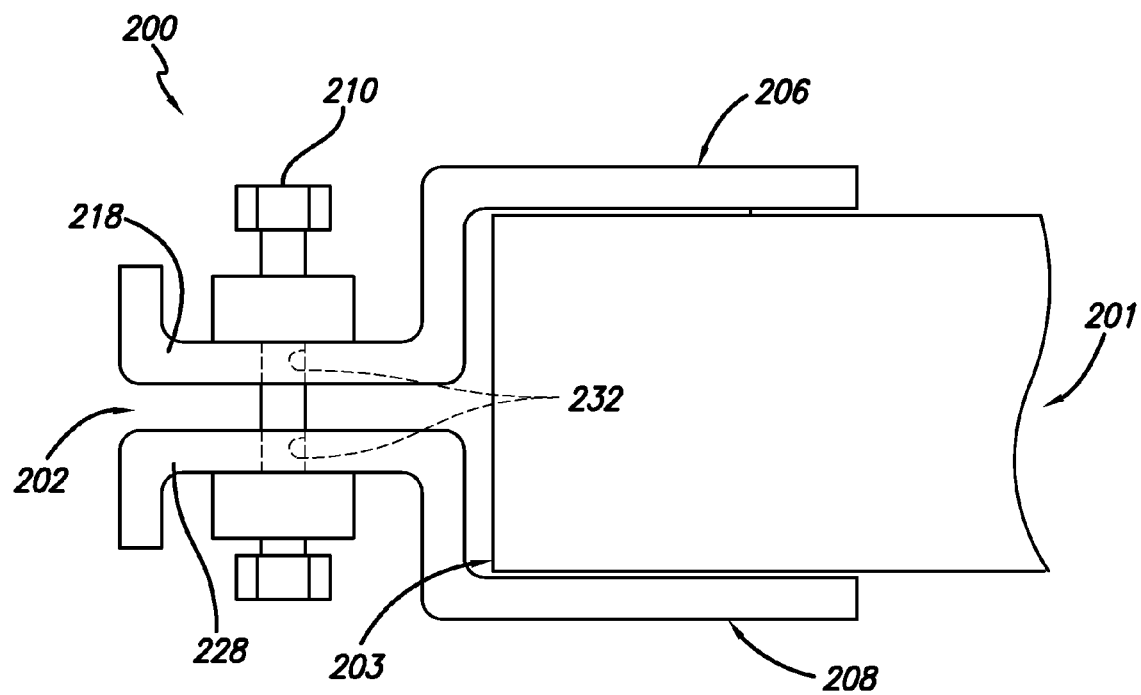
FIG. 5 is a fragmentary end elevation view of a clamp of another exemplary embodiment of a clamping system showing the clamp secured to a countertop.

FIG. 5 illustrates a clamp 202 of a low-profile clamping system 200 according to another exemplary embodiment. The clamp 202 is shown positioned over an edge portion 203 of a countertop 201 and secured thereto. The clamp 202 generally includes a first support 206, a second support 208, and fasteners 210 for releasably securing the supports 206 and 208 to the countertop 201. And the fasteners 210 do not extend substantially above and/or below the supports 206 and 208. In this embodiment, the fasteners 210 extend through openings 232 in fastening members 218 and 228 of each of the first and second supports 206 and 208, and operate to pull the supports 206 and 208 generally together when tightened, etc. to secure the supports 206 and 208 to the countertop.

Figure 6:
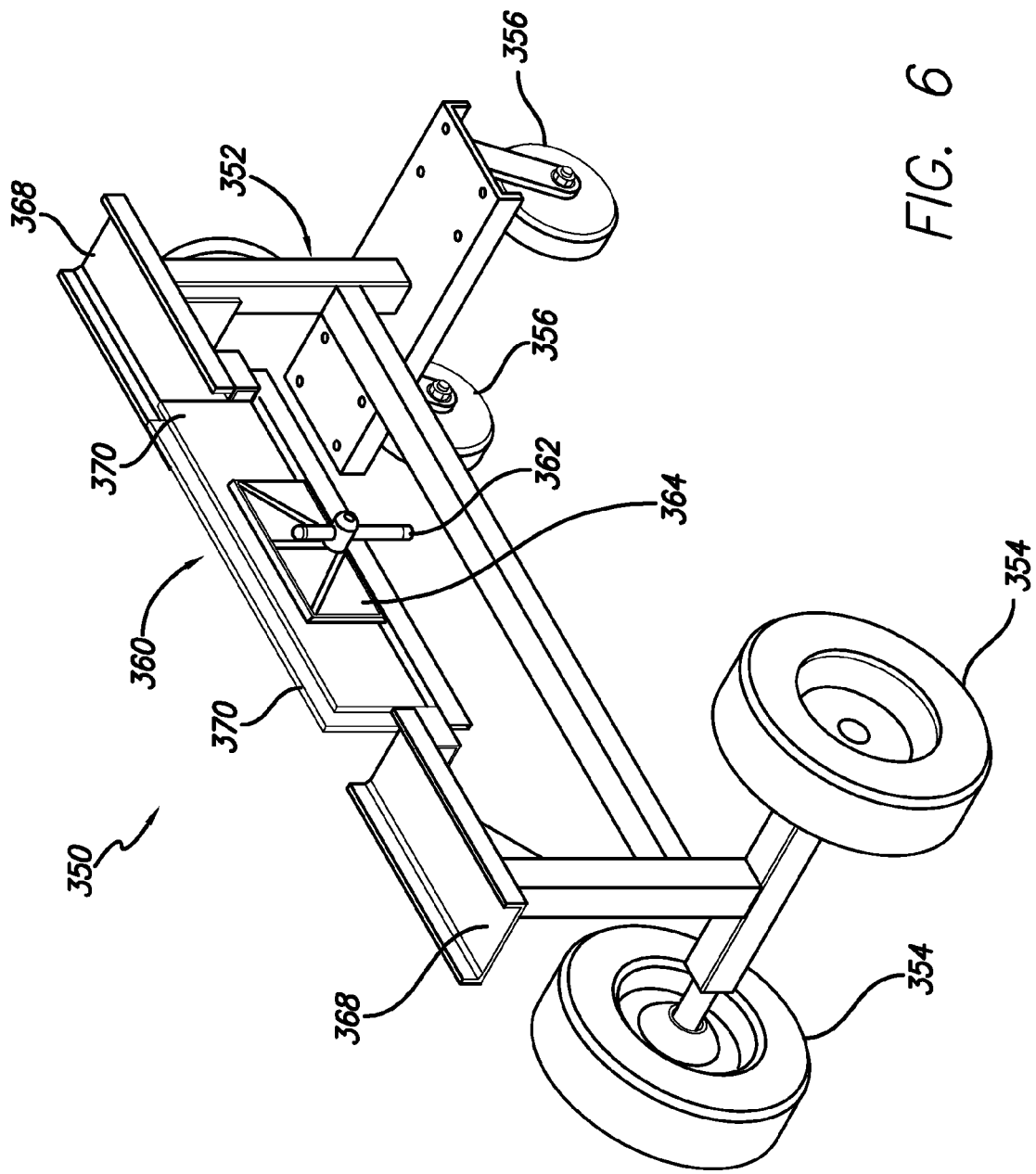
FIG. 6 is a perspective view of an exemplary embodiment of a dolly for use in transporting a countertop.
Figure 7:
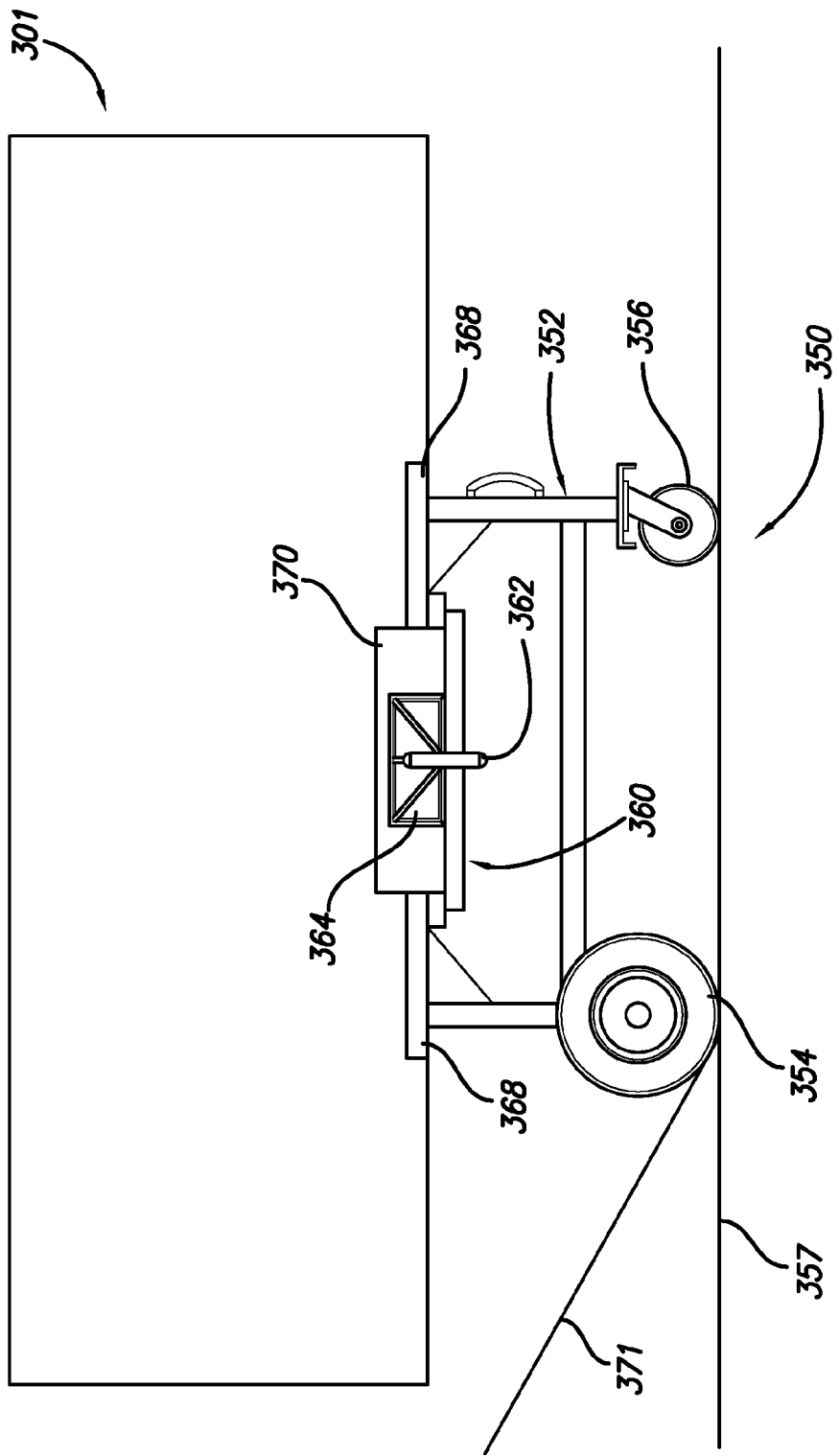
FIG. 7 is a side elevation view of the dolly of FIG. 6 shown holding a countertop for transport.

FIGS. 6 and 7 illustrate an exemplary embodiment of a dolly 350 suitable for use in transporting a countertop 301. The dolly 350 includes a frame 352 having wheels 354 and 356 coupled thereto for allowing rolling movement of the dolly 350 over, for example, a ground surface 357. The wheels 356 are rotatable and can help guide, maneuver, etc. the dolly 350 over the ground surface 357 without, for example, lifting the dolly 350. Other wheel configurations may be used within the scope of the present disclosure. For example, more than or less than four total wheels may be used with the dolly 350, and/or more than or less than two rotatable wheels may be used with the dolly 350. And while the wheels 354 are sized differently from the wheels 356 in the illustrated embodiment, the wheels may all be similarly sized within the scope of the present disclosure. The dolly frame 352 may be formed from materials including, for example, metals (e.g., steel, aluminum, etc.), plastics, composites, combinations thereof, etc. within the scope of the present disclosure.

The dolly 350 also includes an adjustable vice 360 coupled to the frame 352 for use in securing the countertop 301 to the dolly 350. The vice 360 generally includes a lever 362 and two push plates (each indicated at 364) operatively coupled to the lever 362. A drive member (e.g., a screw, etc.) (not shown) may connect the lever 362 to the push plates 364 so that rotation of the lever 362 rotates the drive member and moves the push plates 364 either together or apart. Edge platforms 368 are also coupled to the dolly frame 352 on opposite sides of the vice 360 to help support and stabilize the countertop 301 when retained in the dolly 350 by the vice 360.

Support walls (each indicated at 370) are coupled to each of the vice push plates 364 to help hold the countertop 301 in the vice 360. The walls 370 are configured (e.g., sized, shaped, constructed, etc.) to engage the countertop 301 and hold it generally between the walls 370. In the illustrated embodiment, the walls 370 are each sized (e.g., include a width dimension, height dimension, thickness dimension, etc.) to help inhibit movement of the countertop 301 relative to the dolly 350. In other words, the walls 370 of the vice 360 are each sized to engage a sufficient portion of the countertop 301 to help inhibit the countertop 301 from breaking within the vice 360, for example under the weight of the countertop 301. For example, the walls 370 in the illustrated dolly 350 may have a height dimension of about 5.0 inches (about 12.7 centimeters), a width dimension of about 15.4 inches (about 39.1 centimeters), and a thickness dimension of about 0.5 inches (about 1.3 centimeters). The walls 370 of the vice 360 may have different dimensions than disclosed herein within the scope of the present disclosure. In addition, one of the vice walls 370 can have one or more different dimensions than the other vice wall 370. In addition, the engagement portions of the walls 370 may include linings, coverings, etc. to help prevent them from marring, scratching, etc. surfaces of the countertop 301 retained in the vice 360.

To place the countertop 301 in the dolly 350, the vice lever 362 can initially be rotated to separate the support walls 370 so that the countertop 301 can be placed between the walls 370 within the vice 360 in a generally vertical position (with the edge platforms 368 receiving and supporting at least part of an edge portion of the countertop 301). The vice lever 362 can then be again rotated (e.g., in an opposite direction to that for separating the support walls 370) to tighten the vice and move the walls 370 into engagement with the countertop 301. Here, the walls 370 squeeze the countertop 301 therebetween to securely hold, clamp, etc. the countertop 301 on the dolly 350. The countertop 301 can be disengaged from the vice 360 and removed from the dolly 350 by rotating the vice lever 362 and moving the walls 370 away from the countertop 301 (so that the countertop 301 may be lifted out of the vice 360 and off the dolly 350).

Once the countertop 301 is secured in the dolly, the countertop 101 and dolly 350 can be jointly moved to transport the countertop 301 as desired. In the illustrated embodiment, if it is required to move the countertop 301 and dolly 350 up or down a step during transport, the countertop 301 can be lifted, which results in the dolly 350 being also lifted. When the step is cleared, the countertop 301 and dolly 350 can be lowered and further rolled to the desired location. Thus, lifting the countertop 301 when secured in the dolly 350 advantageously may not disengage the countertop 301 from the dolly 350.

As shown in FIG. 7, the frame 352 of the dolly 350 and/or the wheels 354 and 356 coupled to the frame 352 are configured (e.g., sized, shaped, constructed, etc.) to hold the countertop 301 a distance above the ground surface 357 over which the dolly 350 may roll. In the illustrated embodiment, this includes a distance that may advantageously hold the longitudinal ends of the countertop 301 above the ground surface 357 when rolling the sheet material (on the dolly 350), for example, into an inclined surface 371. This may also include a distance that may advantageously hold the longitudinal ends of the countertop 301 above the ground surface 357 when rolling the sheet material (on the dolly 350) out of an inclined surface, into and/or out of a declined surface, over curbs, etc. If such a distance above the ground surface is not provided, the longitudinal ends of the countertop 301 may, for example, engage, drag, etc. the ground surface at the inclines and/or declines and damage the countertop 301.

The materials, dimensions, etc. provided herein are for purposes of illustration only. Clamping systems (and components thereof) and dollies (and components thereof) may be formed from different materials and/or with different dimensions depending, for example, on the particular application, such as the type and/or size of sheet material to be supported and/or transported.

It will be understood that when an element is referred to as being "secured", "connected", or "coupled" to another element, it can be directly connected or coupled to the other element or intervening elements may be present. In contrast, when an element is referred to as being "directly secured", "directly connected", or "directly coupled" to another element, there are no intervening elements present. Other words used to describe the relationship between elements should be interpreted in a like fashion (e.g., "between" versus "directly between," "adjacent" versus "directly adjacent," etc.).

It will be understood that, although the terms first, second, third etc. may be used herein to describe various elements, components, regions, portions, and/or sections, these elements, components, regions, portions, and/or sections should not be limited by these terms. These terms are only used to distinguish one element, component, region, portion, or section from another element, component, region, portion, or section. Thus, a first element, component, region, portion, or section discussed below could be termed a second element, component, region, portion, or section without departing from the scope of the example embodiments.

Certain terminology is used herein for purposes of reference only, and thus is not intended to be limiting. For example, terms such as "upper", "lower", "above", and "below" refer to directions in the drawings to which reference is made. Terms such as "front", "forward", "back", "rear", "rearward", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order or quantity unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted.

The present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. A clamping system suitable for installation to a sheet material for use in supporting at least part of the sheet material against bending, the clamping system comprising:
   first and second spaced apart and separate elongate supports engageable with the sheet material for supporting at least part of the sheet material against bending, the first elongate support configured to move relative to the second elongate support to thereby adjust a spacing between the first and second elongate supports for use in positioning the first and second elongate supports along a length of the sheet material;
   fasteners located along the first and second elongate supports for releasably coupling the first and second elongate supports to the sheet material along the length of the sheet material;
   threaded fixtures connected to the second elongate support, wherein the threaded fixtures are disposed between at least part of the first elongate support and at least part of the second elongate support, and wherein the fasteners include threaded fasteners for mating reception within the threaded fixtures for releasably coupling the first and second elongate supports to the sheet material;
   wherein the first elongate support is generally S-shaped; and
   wherein the second elongate support includes openings located along a length of the second elongate support for receiving the fasteners, the fasteners extending through said openings when releasably coupling the first and second elongate supports to the sheet material, and the threaded fixtures connected to the second elongate support at said openings.

2. The clamping system of claim 1 wherein the fasteners are configured to engage the first elongate support and apply a pushing force to the first elongate support to thereby move the first elongate support toward the second elongate support.

3. The clamping system of claim 1 wherein the first and second elongate supports define a channel for receiving an edge portion of the sheet material into the channel when supporting the sheet material.

4. The clamping system of claim 3 wherein the first and second elongate supports each include an engagement member for engaging the sheet material, and a back member connected to the engagement member, each back member being oriented generally perpendicularly to each corresponding engagement member.

5. The clamping system of claim 4 wherein the engagement member of the first elongate support, the back member of the first elongate support, and the engagement member of the second elongate support generally define said channel.

6. The clamping system of claim 4 wherein the first and second elongate supports each include a fastener member operable with the fasteners for releasably coupling the first and second elongate supports to the sheet material, each fastener member being oriented generally perpendicularly to each corresponding back member;
   wherein the engagement member, the back member, and the fastener member of the first elongate support define the generally S-shape of the first elongate support.

7. The clamping system of claim 1 comprising at least three fasteners for releasably coupling the first and second elongate supports to the sheet material.

8. The clamping system of claim 1 further comprising:
third and fourth spaced apart and separate elongate supports engageable with the sheet material for supporting at least part of the sheet material against bending, the first elongate support configured to move relative to the second elongate support to thereby adjust a spacing between the first and second elongate supports for use in positioning the first and second elongate supports along a length of the sheet material;
fasteners located along the first and second elongate supports for releasably coupling the third and fourth elongate supports to the sheet material along the length of the sheet material;
wherein the first and second elongate supports are engageable with the sheet material at a first edge portion of the sheet material, and the third and fourth elongate supports are engageable with the sheet material at a second edge portion of the sheet material.

9. A low-profile clamping system suitable for installation to a sheet material for use in supporting at least part of the sheet material against bending, the clamping system comprising:
a first support having an engagement member and a second opposing support having an engagement member, the engagement members configured to receive an edge portion of the sheet material between the engagement members when the first and second supports are positioned for supporting at least part of the sheet material;
threaded fasteners for releasably coupling the first and second supports to the edge portion of the sheet material;
threaded fixtures disposed between at least part of the first elongate support and at least part of the second elongate support for mating reception with the threaded fasteners for releasably coupling the first and second elongate supports to the sheet material;
wherein the engagement member of the first support is contained generally within a first plane and the engagement member of the second support is contained generally within a second plane; wherein the first plane is oriented generally parallel to the second plane; wherein the first and second planes are oriented generally perpendicular to longitudinal axes of the fasteners; wherein the first and second supports are disposed generally between said first and second planes; and wherein the fasteners are disposed generally between said first and second planes.

10. The clamping system of claim 9 wherein the first and second supports each include a fastener member operable with the fasteners for releasably coupling the first and second supports to the edge portion of the sheet material, each fastener member being oriented generally parallel to the engagement member of the corresponding support.

11. The clamping system of claim 10 wherein the fastener member of the second support includes an opening, the fasteners configured to extend through said opening and engage the fastener member of the first support and thereby move the first support toward the second support.

12. The clamping system of claim 9 wherein at least one of the engagement members includes a stackable surface for receiving at least part of an engagement member of another clamping system into generally face-to-face engagement with said stackable surface for accommodating close-together placement of two or more sheet materials to which the clamping systems are installed.

13. The clamping system of claim 9, wherein the first support and/or the second support is generally S-shaped.

14. A clamping system suitable for installation to a sheet material for use in supporting at least part of the sheet material against bending, the clamping system comprising:
first and second elongate supports configured to be installed to an edge portion of the sheet material for supporting at least part of the sheet material against bending, the first and second elongate supports each having a length dimension that extends along the edge portion of the sheet material when the first and second elongate supports are installed thereto and a width dimension that extends transverse to the edge portion of the sheet material when the first and second elongate supports are installed thereto, the length dimension of each of the first and second elongate supports being greater than the width dimension of each of the first and second elongate supports;
at least two or more fasteners located along the length dimensions of the first and second elongate support members for releasably coupling the first and second elongate supports to the edge portion of the sheet material along a length of the sheet material for supporting said at least part of the sheet material against bending;
wherein the first and second elongate supports each include an engagement member configured to engage the edge portion of the sheet material, and a back member connected to the engagement member, each back member being oriented generally perpendicularly to each corresponding engagement member;
wherein the engagement member of the first elongate support, the back member of the first elongate support, and the engagement member of the second elongate support define a channel extending along a length of the first and second elongate supports for receiving the edge portion of the sheet material into the channel when supporting the sheet material, the two or more fasteners disposed entirely outside of the channel; and
wherein the back member of the first elongate support includes a first side surface generally facing the channel and a second side surface generally facing away from the channel, and wherein the fastener is disposed adjacent the second side surface of the back member and entirely outside of the channel defined by the first and second elongate supports.

15. The clamping system of claim 14, wherein the first elongate support and/or the second elongate support is generally S-shaped.

16. A clamping system suitable for installation to a sheet material for use in supporting at least part of the sheet material against bending, the clamping system comprising:
first and second spaced apart and separate elongate supports engageable with the sheet material for supporting at least part of the sheet material against bending, the first elongate support configured to move relative to the second elongate support to thereby adjust a spacing between the first and second elongate supports for use in positioning the first and second elongate supports along a length of the sheet material;
fasteners located along the first and second elongate supports for releasably coupling the first and second elongate supports to the sheet material along the length of the sheet material;
wherein the first elongate support is generally S-shaped;
wherein the second elongate support includes openings located along a length of the second elongate support for receiving the fasteners, the fasteners extending through said openings when releasably coupling the first and second elongate supports to the sheet material; and wherein the fasteners are configured to engage the first elongate support and apply a pushing force to the first elongate support to thereby move the first elongate support toward the second elongate support.

17. A clamping system suitable for installation to a sheet material for use in supporting at least part of the sheet material against bending, the clamping system comprising:

first and second spaced apart and separate elongate supports engageable with the sheet material for supporting at least part of the sheet material against bending, the first elongate support configured to move relative to the second elongate support to thereby adjust a spacing between the first and second elongate supports for use in positioning the first and second elongate supports along a length of the sheet material;

fasteners located along the first and second elongate supports for releasably coupling the first and second elongate supports to the sheet material along the length of the sheet material;

wherein the second elongate support includes openings located along a length of the second elongate support for receiving the fasteners, the fasteners extending through said openings when releasably coupling the first and second elongate supports to the sheet material;

wherein the first and second elongate supports define a channel for receiving an edge portion of the sheet material into the channel when supporting the sheet material;

wherein the first and second elongate supports each include an engagement member for engaging the sheet material, a back member connected to the engagement member and oriented generally perpendicularly to the engagement member, and a fastener member oriented generally perpendicularly to the back member and operable with the fasteners for releasably coupling the first and second elongate supports to the sheet material; and wherein the engagement member, the back member, and the fastener member of the first elongate support define a generally S-shape of the first elongate support.

18. A clamping system suitable for installation to a sheet material for use in supporting at least part of the sheet material against bending, the clamping system comprising:

first and second spaced apart and separate elongate supports engageable with the sheet material for supporting at least part of the sheet material against bending, the first elongate support configured to move relative to the second elongate support to thereby adjust a spacing between the first and second elongate supports for use in positioning the first and second elongate supports along a length of the sheet material;

at least three fasteners located along the first and second elongate supports for releasably coupling the first and second elongate supports to the sheet material along the length of the sheet material;

wherein the first elongate support is generally S-shaped; and wherein the second elongate support includes openings located along a length of the second elongate support for receiving the fasteners, the fasteners extending through said openings when releasably coupling the first and second elongate supports to the sheet material.

* * * * *